United States Patent [19]

Perrot

[11] Patent Number: 4,918,660
[45] Date of Patent: Apr. 17, 1990

[54] INDUSTRIAL TREATMENT MACHINES WITH ROTATING VESSEL

[76] Inventor: Yvan Perrot, Port-Lesney, Arbois, France, 39600

[21] Appl. No.: 177,603

[22] Filed: Apr. 5, 1988

[30] Foreign Application Priority Data

Apr. 14, 1987 [FR] France .................. 87 05467

[51] Int. Cl.⁴ .................. B01F 15/02; B01F 9/02
[52] U.S. Cl. .................. 366/185; 366/188; 366/220; 366/347; 49/40; 220/345
[58] Field of Search .............. 366/142, 185, 187, 188, 366/193, 220, 347, 234; 49/40, 41, 280; 204/213, 214; 34/108; 68/23 R, 24; 220/345, 346

[56] References Cited

U.S. PATENT DOCUMENTS

| | | | |
|---|---|---|---|
| 2,558,220 | 6/1951 | McLachlin | 49/40 X |
| 2,960,778 | 11/1960 | Cowlin | 49/41 X |
| 3,206,058 | 9/1965 | Widigen | 49/40 X |
| 3,295,649 | 1/1967 | Giuseppe | 68/24 X |
| 3,583,739 | 6/1971 | Gill | 204/213 X |
| 3,788,004 | 1/1974 | Billeri et al. | 49/41 |
| 3,944,189 | 3/1976 | Singleton | 366/220 X |
| 3,957,254 | 3/1976 | Charpentier | 366/220 |
| 4,171,819 | 10/1979 | Martineau | 366/320 X |
| 4,736,868 | 4/1988 | Carmon | 220/345 |

*Primary Examiner*—Harvey C. Hornsby
*Assistant Examiner*—Joseph S. Machuga
*Attorney, Agent, or Firm*—Dowell & Dowell

[57] ABSTRACT

Industrial treatment machines having a rotating vessel, wherein the vessel is driven in rotation via the door for obturating the access opening, so that, by switching on a gear motor, the door automatically closes, while reversal of the direction of rotation of the motor provokes opening of the door.

9 Claims, 4 Drawing Sheets

INDUSTRIAL TREATMENT MACHINES WITH ROTATING VESSEL

BACKGROUND OF THE INVENTION

1. Field of the Invention

The present invention relates to industrial treatment machines which includes a rotating vessel, of the type such as those used for burring, degreasing, drying or for the cryogenization of pieces in bulk, or in grinding, washing, tanning and other treatments.

2. History of the Related Art

It is known that, in treatment machines of the type mentioned above, that the rotating vessel, which is most often of polygonal section, comprises on its lateral wall an opening which extends virtually over the whole of its length and which is associated with a door for closure, which must obviously be opened for charging and discharging the vessel and closed during treatment by rotation. Depending on the case, this access door is pivotally or slidably mounted on the vessel, but in any case it is of course indispensable to provide a locking mechanism ensuring effective retention in the closed position. Experience has shown that the presence of the locking mechanism complicates and renders fastidious the charging and discharging manoeuvres.

SUMMARY OF THE INVENTION

It is a principal object of the invention to overcome the aforementioned drawback essentially by ensuring drive of the vessel in rotation via the closure door which is joined to the vessel by a system of small lateral rods and of which the angular displacement with respect thereto is limited by stop effect.

By a suitable arrangement of the closure assembly, the door may be arranged to be maintained in closed position when rotation is effected in one direction, and, on the contrary, to be automatically brought into an open position when the direction of rotation is reversed.

A BRIEF DESCRIPTION OF THE DRAWING

The invention will be more readily understood on reading the following description with reference to the accompanying drawings, in which.

DESCRIPTION OF THE PREFERRED EMBODIMENT

Figure 1:
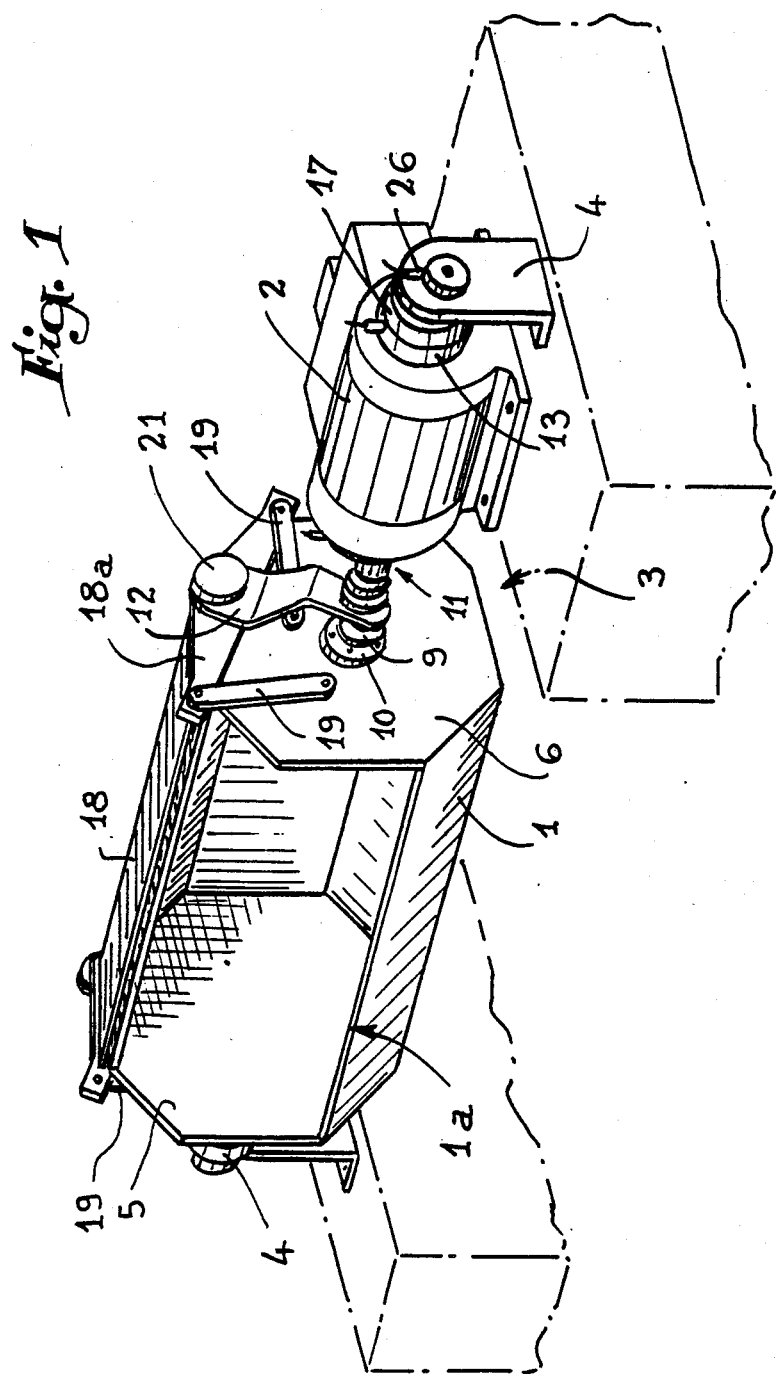
FIG. 1 is a view in perspective illustrating the general arrangement of a machine having a rotating vessel according to the invention.

Referring now to the drawings, and firstly to FIG. 1, reference 1 designates the rotating vessel of a burring machine. This vessel 1 is driven in rotation with the aid of an electric gear motor 2, the assembly 1-2 being supported above a pit 3 with the aid of bearings 4. The vessel 2 presents an octogonal transverse section and its longitudinal wall has an access opening 1a cut out therein which occupies two contiguous faces of the said section.

The lateral side element or end wall 5 of the vessel 1 cooperates directly with the corresponding bearing 4 while the opposite side element or end wall 6 is supported, with the interposition of a self-centering system 7, by the end of a shaft 8 on which is fitted a bushing 9 connected to the side element 6 by a bell 10 made of an elastically deformable material.

On shaft 8 there freely rotates a tubular shaft 11 which is driven in rotation by the output member of the gear motor 2. The end of this shaft 11 which faces the side element 6 is secured to the hub of a radial arm 12, while the opposite end bears a plate 13 equipped with an annular winding 14 which is connected to the electrical circuit of the gear motor 2. This winding 14 is intended magnetically to attract a disc 15 which is rendered non-rotatably secured relative to the shaft 8 while being capable of axially sliding thereon; springs 16 tend to apply this disc 15 against a brake rim 17 secured against the bearing 4.

As illustrated in FIG. 1, the arm 12 secured to the tubular shaft 11 is elbowed so that its upper end may cooperate with one of the two lateral side elements of a door 18 intended for obturating the opening 1a giving access to the vessel 1. This door presents a cross section in the form of a circumflex accent in order to be able to cover the opening.

Figure 3:
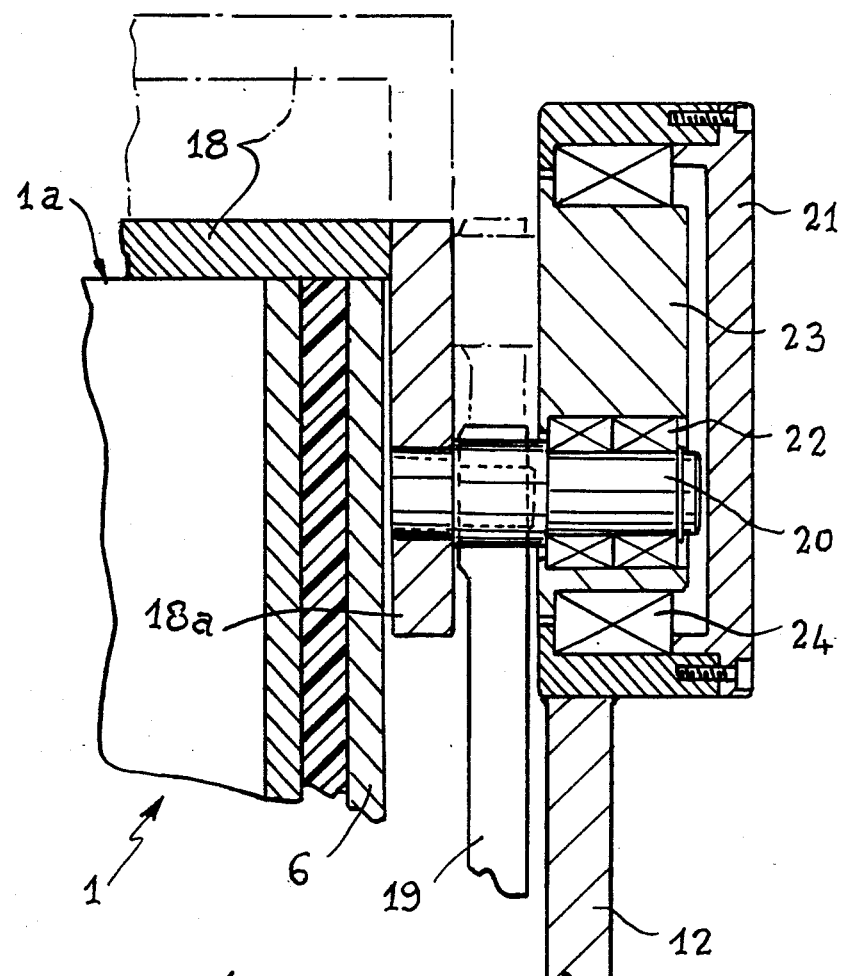
FIG. 3 is a section, on a larger scale, showing the connection between one of the sides of the door and the lateral arm which ensures the movement thereof.

Each of the sides of the door 18 is connected to the corresponding side element 5 or 6 of the vessel 1 with the aid of two small rods 19, which are pivotally fixed on each side element so as to determine two end positions of opening and of closure for which one or the other of the two longitudinal edges of said door comes into abutment against the wall of the vessel 1. Furthermore and as shown in FIG. 3, the side 18a of this door 18 which is turned in the direction of arm 12 is fixed to a horizontal pin 20 which penetrates inside a small cylindrical casing 21 fixed at the end of the arm; a double roller bearing 22 ensures eccentric assembly of the pin 20 in an eccentric 23 retained inside the casing 21 by a roller bearing 24.

When setting forth the operation of the machine according to the invention, it will firstly be assumed that the vessel 1 is in stopped position with the door 18 positioned so as to reveal the opening 1a with a view to charging. Once charging is terminated, the operator switches on the gear motor 2, which has for its effect angularly displaces the arm 12. The winding 14 is not excited, with the result that the disc 15 is applied against the rim 17 which ensures angular immobilization of the shaft 8 and of vessel 1.

Figure 2:
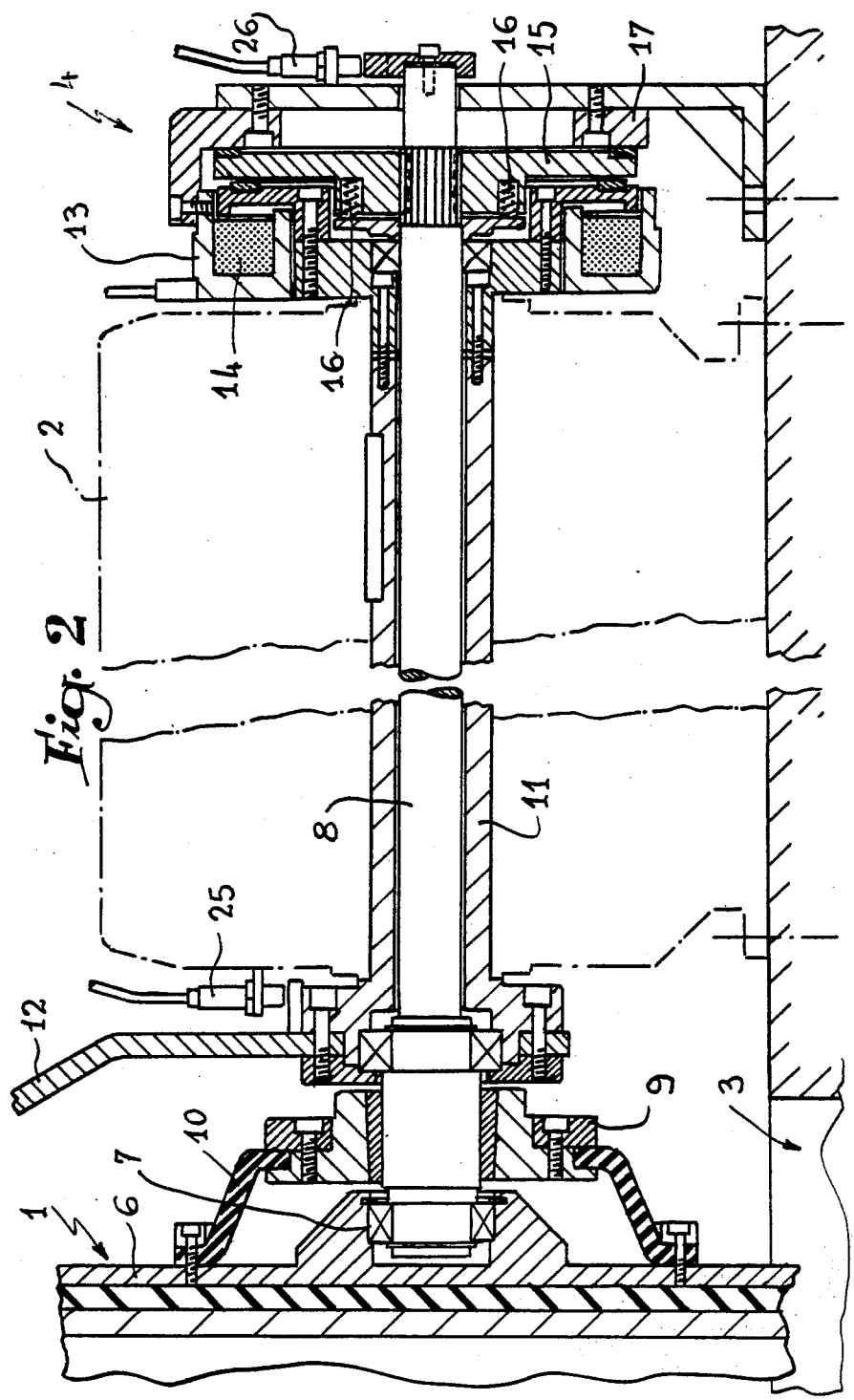
FIG. 2 is an axial section in detail showing the drive arrangement of the device for rotating the vessel.

The displacement of the arm 12 has for its effect to close the door 18, the eccentric 23, by rotation in casing 21, enabling the arm to extend in order to allow translation of the door from the open position to the closed position. At that moment, a sensor 25 (FIG. 2), inserted on the circuit connecting the winding 14 to the electrical supply of the gear motor 2 and controlled by a boss or cam provided on the hub of the arm 12, ensures supply of the winding 14 which attracts the disc 15 against springs 16. This disc 15 is consequently released and enables the shaft 8 and the vessel 1 to move in rotation, such displacement being effected solely through the arm 12 which acts on the door 18, which abuts against the vessel in closed position.

Figure 4:
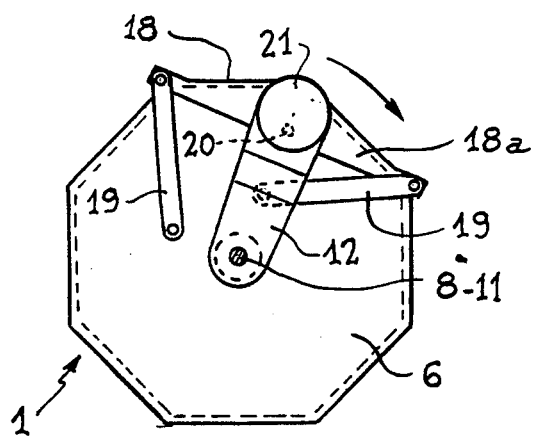
FIGS. 4, 5 and 6 are side views schematically illustrating the operation of the door assembly.

The position is then the one illustrated in FIG. 4 and it will be understood that the drive of the vessel 1 in rotation may continue up to the end of the treatment of the pieces that it contains. It will be observed that the connection ensured by the assembly 14-15 between the two shafts 8 and 11 radically opposes any untimely opening of the door 18 in the event of an untimely displacement of the charge under the effect of an unbalance suddenly accelerating rotation of the vessel 1 up to a speed greater than that which the arm 12 imparts to the door.

Figure 5:
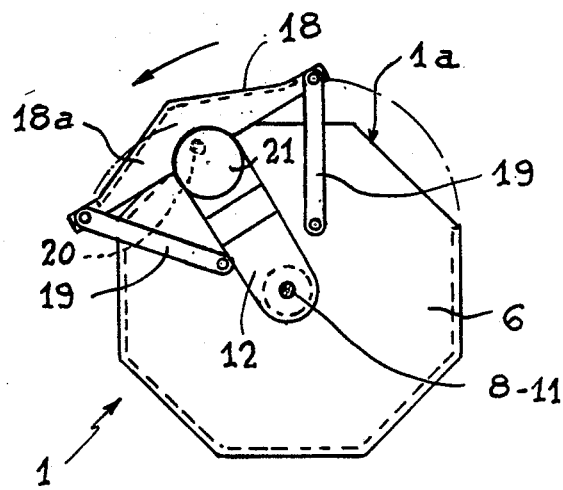
Figure 6:
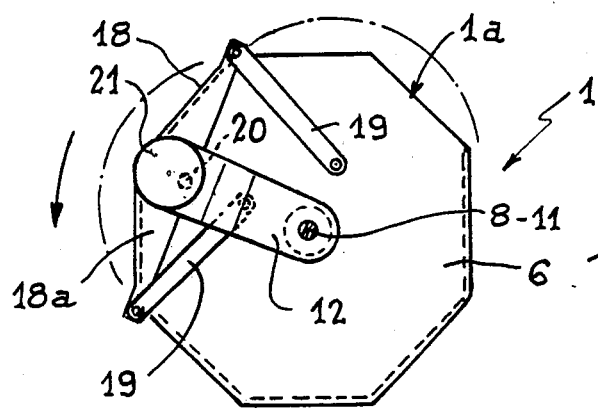

At the end of treatment, the gear motor 2 is stopped. Cutting of the current provokes immediate blocking of the vessel under the effect of the springs 16, since the winding 14 is no longer energized. In order to ensure automatic opening of the door 18, it suffices for the operator to reverse the supply of the gear motor 2 so that the arm 12 effects sliding of the door in the manner illustrated in FIG. 5. When opening 1a has been completely revealed by the effect of stopping the reverse rotation, the vessel 1, released as soon as the gear motor is switched on again, rotates in turn in opposite direction (FIG. 6) until said opening 1a faces downwardly.

At that moment, a sensor 26 (FIG. 2), associated with a cam borne by the shaft 8 fixed to the vessel 1, automatically cuts off energy to the gear motor 2 and again ensures angular immobilization of the vessel. The contents thereof are automatically poured into the pit 3 by gravity. The machine is then ready for a fresh cycle of operation.

Finally, it will be understood that the successive manoeuvres of closure of the door 18 after charging of the vessel, opening of this door at the end of treatment, and discharge of the contents, are effected automatically simply by controlling the gear motor 2.

It must, moreover, be understood that the foregoing description has been given only by way of example and that it in no way limits the domain of the invention which would not be exceeded by replacing the details of execution described by any other equivalents. In particular, the invention is applicable to treatment vessels of circular section; to that end, it suffices either to arrange the two pairs of small rods 19 suitably in order to determine an effect of stop of the door against the wall of the vessel 1 in the two extreme positions of opening and of closure, or to provide the vessel with two stops adapted to cooperate with the door 18 with a view to ensuring drive of the vessel in the two directions of rotation.

What is claimed is:

1. In an industrial machine having a rotating vessel which includes a door adapted to close an access opening made between opposing longitudinal walls thereof and wherein the door is moveably mounted to the vessel by pivotable rods and wherein a motor means is provided for rotating the vessel, the improvement comprising, a drive shaft means extending from said motor means, a radial arm having first and second ends, said first end being connected to said drive shaft means so as to be rotated thereby, an eccentric means, first connector means for connecting said eccentric means to said second end of said radial arm, second connector means for connecting said eccentric means to the door so that the door is connected to said drive shaft means, said eccentric means and said second connector means permitting an extension of the door to permit opening and closing of the door relative to the access opening in the vessel.

2. The industrial machine of claim 1 wherein said first connector means includes a casing having a first bearing means therein, said eccentric means being rotatable relative to said first bearing means, said second connector means including a pin means mounted to said eccentric means, said pin means having an outer end connected to the door, said pin means being rotatable with said eccentric means relative to said housing so as to permit the door to open and close with respect to the access opening.

3. In an industrial machine having a rotating vessel which includes a door adapted to close an access opening made between opposing longitudinal walls thereof, and wherein the door is moveably mounted to the vessel by pivotable rods, and wherein motor means is provided for rotating the vessel, the improvement comprising a drive shaft means, a support shaft means, said support shaft means being concentric with said drive shaft means, a radial arm means connecting said drive shaft means to the door, a brake device for selectively preventing rotation of said support shaft means when said radial arm means is moved to close the door relative to said access opening, and an electromagnetic means for selectively releasing said brake means, whereby upon release of said brake means; when said door is in the closed position, the vessel is rotatably driven by said drive means through the connecting radial arm means and door.

4. In an industrial machine having a rotating vessel which includes a door adapted to close an access opening made between opposing longitudinal walls thereof and wherein the door is moveably mounted to the vessel by pivotable rods and wherein motor means is provided for rotating the vessel, the improvement comprising a drive shaft means, a support shaft means, means for connecting said drive shaft means to said motor means, a radial arm means, first connector means for connecting said radial arm means to the door, said first connector means including an eccentric means, second connector means for connecting said radial arm means to said drive shaft means for selectively opening and closing the door relative to the access opening, brake means for preventing rotation of the vessel when said radial arm is being moved to close the door relative to the access opening, and electromagnetic means for releasing said brake means, whereby upon release of said brake means; when said door is in the closed position, the vessel is rotatably driven by said drive means through the connecting radial arm means and door.

5. The industrial machine of claim 4 including first sensor means for sensing when the door is moved to a closed position relative to the access opening, said first sensor means being operably connected to said electromagnetic means to actuate said electromagnetic means to release said brake means when the door is moved to a closed position with respect to the access opening.

6. The industrial machine of claim 4 in which the vessel is rotatably supported on said support shaft, said drive shaft means including a tubular shaft through which said support shaft extends, said radial arm means being connected to said tubular shaft.

7. The industrial machine of claim 6 including a self-centering mechanism mounted between said support shaft and the vessel, and an elastically deformable bell means mounted to said support shaft in surrounding relationship to said self-centering mechanism, said bell means having an outer portion connected to the vessel.

8. The industrial machine of claim 6 including second sensor means, means carried by said support shaft for indicating a pre-selected position thereof, said second sensor means being operable in response to said means for indicating a pre-selected position of the support shaft to de-energize said electromagnetic means to thereby permit said brake means to retain the vessel in the pre-selected position.

9. The industrial machine of claim 6 including said radial arm means having first and second ends, said first end being connected to said drive shaft means, said first connector means including a casing carried by said second end of said radial arm means, bearing means for rotatably mounted said eccentric means within said casing a pin means mounted to said eccentric means, said pin means having an outer end connected to the door, said pin means being rotatable with said eccentric means with respect to said casing so as to permit the door to open and close with respect to the access opening.

* * * * *